US009024896B2

(12) United States Patent
Chen

(10) Patent No.: US 9,024,896 B2
(45) Date of Patent: May 5, 2015

(54) IDENTIFICATION METHOD FOR SIMULTANEOUSLY IDENTIFYING MULTIPLE TOUCH POINTS ON TOUCH SCREENS

(76) Inventor: Weishan Chen, Guangdong (CN)

( * ) Notice: Subject to any disclaimer, the term of this patent is extended or adjusted under 35 U.S.C. 154(b) by 391 days.

(21) Appl. No.: 13/637,406

(22) PCT Filed: Apr. 23, 2010

(86) PCT No.: PCT/CN2010/072104
§ 371 (c)(1),
(2), (4) Date: Oct. 24, 2012

(87) PCT Pub. No.: WO2011/116538
PCT Pub. Date: Sep. 29, 2011

(65) Prior Publication Data
US 2013/0033449 A1 Feb. 7, 2013

(30) Foreign Application Priority Data
Mar. 26, 2010 (CN) .......................... 2010 1 0137236

(51) Int. Cl.
*G06F 3/041* (2006.01)
*G06F 3/042* (2006.01)

(52) U.S. Cl.
CPC ............ *G06F 3/0421* (2013.01); *G06F 3/0416* (2013.01); *G06F 2203/04808* (2013.01); *G06F 2203/04104* (2013.01)

(58) Field of Classification Search
CPC ..... G06F 3/041; G06F 3/0421; G06F 3/0416; G06F 3/0488; G06F 3/0418; G06F 2203/04104; G06F 2203/04808
USPC ...................... 345/173–184; 178/18.01–20.01
See application file for complete search history.

(56) References Cited

U.S. PATENT DOCUMENTS

| | | | |
|---|---|---|---|
| 2008/0158172 A1* | 7/2008 | Hotelling et al. | 345/173 |
| 2009/0085881 A1* | 4/2009 | Keam | 345/173 |
| 2009/0135162 A1* | 5/2009 | Van De Wijdeven et al. | 345/175 |
| 2009/0167724 A1* | 7/2009 | Xuan et al. | 345/175 |
| 2010/0201637 A1* | 8/2010 | Herne et al. | 345/173 |
| 2011/0157096 A1* | 6/2011 | Drumm | 345/175 |
| 2011/0157097 A1* | 6/2011 | Hamada et al. | 345/175 |
| 2011/0169780 A1* | 7/2011 | Goertz et al. | 345/175 |
| 2011/0216042 A1* | 9/2011 | Wassvik et al. | 345/175 |
| 2011/0242056 A1* | 10/2011 | Lee et al. | 345/175 |
| 2012/0218215 A1* | 8/2012 | Kleinert et al. | 345/173 |

* cited by examiner

*Primary Examiner* — Jason Olson
*Assistant Examiner* — Sosina Abebe
(74) *Attorney, Agent, or Firm* — Rosenberg, Klein & Lee

(57) ABSTRACT

An identification method for simultaneously identifying multiple touch points on a touch screen, which includes the following steps: a first step, mounting some optical signal transmitting terminals and some optical signal receiving terminals around the touch screen; a second step, when some touch points appear on the touch screen, performing horizontal and vertical scans to get a preliminary location region; a third step, performing maximum positive inclination revising on the preliminary location region in the second step; a fourth step, performing maximum negative inclination revising on the region in the third step; a fifth step, some said optical signal transmitting terminals transmit optical signal in turn, inclination corresponding receiving terminals correspond to some said optical signal transmitting terminals are controlled in a receiving state in turn; a sixth step, filtering the locations of touch points in the fifth step, removing error points off, finally determining the location results of some said touch points, and finishing the whole identification process.

7 Claims, 8 Drawing Sheets

IDENTIFICATION METHOD FOR SIMULTANEOUSLY IDENTIFYING MULTIPLE TOUCH POINTS ON TOUCH SCREENS

FIELD OF THE INVENTION

The present invention relates to method of identifying touch points on touch screens, more particularly, to an identification method for simultaneously identifying multiple touch points on a touch screen, which method is high effective and fast.

BACKGROUND OF THE INVENTION

As an interactive device having simple producing process and with low producing cost, the infra-red touch screen develops fast in recent years and be vastly applied in various fields. The basic structure of an infra-red touch screen includes multiple pairs of infra-red emitting elements and infra-red receiving elements arranged at edges around a display surface suit for installment according to a special sequence. The above infra-red emitting elements and infra-red receiving elements are made emitting-receiving pairs according to one to one correspondence. The emitting-receiving pairs are perpendicularly arranged at the edge of the display surface to form an emitting-receiving array, under control of micro computer system, each emitting-receiving pair is connected by infra-red rays. By detecting whether the infra-red rays between the infra-red emitting element and the infra-red receiving element of each pair are blocked, whether a touch event occurs is determined.

In the conventional infra-red touch screen system, the rays form a grid on the display surface, while detecting touch, the coordinates of the position where the touch event occurs may be calculated by determining the position of the nodes of the grid where the touch occurs. The way of the conventional detecting makes the detecting system receive only one group of coordinate data in a predetermined time, so if there is only one touch point, the touch screen will work fine, however, if there are more than two touch points, the system will result in wrong coordinates.

Mechanically, the conventional system generally has optical signal emitting devices 1 and optical signal receiving devices 2, wherein each of the optical signal emitting devices 1 is uniquely corresponds to an optical signal receiving device 2. According to the above principal, by placing a plurality of the optical signal emitting devices 1 and the optical signal receiving device 2 around a display screen and by making the rays emitted by the optical signal emitting devices 1 be uniformly distributed in the display area of the display screen, if a user uses fingers or other stuff like pens to touch some position on the display screen, the fingers or the other stuff will block the optical signals emitted by the optical signal emitting devices 1 and the corresponding optical signal receiving devices 2 will not receive the optical signals, further, by using data processing platform to calculate the position the fingers or stuff locate to achieve determining the position the fingers or the other stuff locate on the display screen. However, if more than two touch points display on the display screen, locating the touch points by the above technology will generate high rate of misreading. For example, as shown in FIG. 1 and FIG. 2, if there is a touch point A in FIG. 1, the position will be accurately determined by the above technology, however if there are two points in FIG. 2, the two points may be identified to be A1,A1 or A2,A2 by the above technology, such that misreading occurs.

Besides the above technology, there are some infra-red touch screens utilizing a third direction scanning which can eliminate two ghost points when two points touching happens, however, when the touch points are increased, the method also fail to work, moreover, the method cannot determine the size of the touch points.

Based on the above reasons, the conventional infra-red touch screen technology may fail to work in a circumstance need multiple touches like multiple players game, multiple fingers drawing and so on, which limit the infra-red touch screen to be used in more fields.

SUMMARY OF THE INVENTION

It is an object of the present invention to provide an identification method for simultaneously identifying multiple touch points on a touch screen.

An identification method for simultaneously identifying multiple touch points on a touch screen, including:
a first step, arranging a plurality of optical signal emitting terminals and a plurality of optical signal receiving terminals around a display surface, the optical signal emitting terminals forming optical signal emitting units, the optical signal receiving terminals forming optical signal receiving units, the optical signal emitting units and the optical signal receiving units being arranged at opposite edges of the display surface; one optical signal emitting terminal corresponding to at least three optical signal receiving terminals, that is, the optical signal emitted by the optical signal emitting terminal can be simultaneously received by at least three optical signal receiving terminals, distances of each pair of adjacent optical signal receiving terminals being identical; the optical signal receiving terminal corresponding to the optical signal emitting terminal including a vertical receiving terminal and tilt receiving terminals, wherein the vertical receiving terminal is vertically corresponding to the optical signal emitting terminal, and the tilt receiving terminals are symmetrically distributed two sides of the vertical receiving terminal;
a second step, if there are a plurality of touch points on the display surface, the touch points being between the signal emitting units and the signal receiving units; the touch points being generated by contact stuffs touching the display surface; the optical signal emitting terminals emitting the optical signals in turn, and the corresponding vertical terminal also controlled to be in a receiving mode in turn, while other tilt terminals being in a non-receiving mode;
in the processing of the second step, if there is no touch point between the optical signal emitting terminal and the corresponding vertical terminal, the vertical terminal will receive the optical signals emitted by the optical signal emitting terminal, such that there is no touch point between the optical signal emitting terminal and the corresponding vertical terminal;
if there exists a touch point between the optical signal emitting terminal and the corresponding vertical terminal, the vertical terminal will not receive the optical signals emitted by the optical signal emitting terminal, such that that there exists a touch point between the optical signal emitting terminal and the corresponding vertical terminal;
by the above steps, a preliminary location area where the touch points located on the display surface being obtained;
in a third step, the preliminary location area obtained in the second step being corrected for the first time to obtain a maximum positive tilt angle correction area, the optical signal emitting terminals emitting the optical signals in turn, and the corresponding tilt terminal also controlled to be in the receiving mode in turn, wherein the tilt terminal is at one side of the vertical terminal and furthest away from the vertical receiving terminal;

in the processing of the third step, if there is no touch point between the optical signal emitting terminal and the corresponding tilt terminal, the tilt terminal will receive the optical signals emitted by the optical signal emitting terminal, such that there is no touch point between the optical signal emitting terminal and the corresponding tilt terminal; if there exists a touch point between the optical signal emitting terminal and the corresponding tilt terminal, the tilt terminal will not receive the optical signals emitted by the optical signal emitting terminal, such that there exists a touch point between the optical signal emitting terminal and the corresponding tilt terminal; by the above steps, the preliminary location area obtained in the second step being corrected and narrowed;

in a fourth step, the location area obtained in the third step being corrected for the second time to obtain a maximum negative tilt angle correction area; the optical signal emitting terminals emitting the optical signals in turn, and the corresponding tilt terminal also controlled to be in the receiving mode in turn, wherein the tilt terminal is at the other side of the vertical terminal and furthest away from the vertical receiving terminal;

in the processing of the fourth step, if there is no touch point between the optical signal emitting terminal and the corresponding tilt terminal, the tilt terminal will receive the optical signals emitted by the optical signal emitting terminal, such that there is no touch point between the optical signal emitting terminal and the corresponding tilt terminal will be obtained; if there exists a touch point between the optical signal emitting terminal and the corresponding tilt terminal, the tilt terminal will not receive the optical signals emitted by the optical signal emitting terminal, such that there exists a touch point between the optical signal emitting terminal and the corresponding tilt terminal; by the above steps, the location area obtained in the third step being corrected and narrowed;

in a fifth step, the optical signal emitting terminals emitting the optical signals in turn, and the corresponding tilt terminal also controlled to be in the receiving mode in turn; in the processing of the fifth step, the way of controlling the corresponding tilt terminal to be in the receiving mode in turn being performed according to the following sequence;

step A, at one side of the vertical receiving terminal, besides the tilt receiving terminal in the third step, other tilt receiving terminals being controlled to be receiving mode in turn, from the furthest to the nearest to the vertical receiving terminal;

step B, at the other side of the vertical receiving terminal, besides the tilt receiving terminal in the fourth step, other tilt receiving terminals being controlled to be in the receiving mode in turn, from the furthest to the nearest to the vertical receiving terminal;

the above step A and step B being performed repeatedly, and each repeat will obtain certain location area information; the location area becoming smaller and smaller as the step A and step B repeat; the maximum negative tilt angle correction area obtained in the fourth step being corrected and narrowed to obtain positions of a plurality of touch points;

in a sixth step, fake points being get rid of by filtering the positions of the touch points obtained in the fifth step; the above filtering including firstly setting geometric area of standard touch points, secondly eliminating touch points whose areas are smaller than the geometric area of the standard touch points, and finally determining the result position of the touch points to finish the whole recognition process.

The method is very high effective, and can highly promote the identification efficiency, reduce calculating times and finally achieve obtaining the position of the touch points A in very short time.

The touch screen of the present disclosure has simple structure and is compact while the cost is very low.

The method of the present disclosure not only recognizes single touch, but also recognizes multiple touches, meanwhile, the size and approximate shape of the touch points are also recognized.

Because of utilizing infrared touch frame, comparing to the infrared camera method for multiple touch point recognizing, the present disclosure is much stable, low cost and can be applied to various fields, therefore can be applied in LCD devices.

The algorithm of the present disclosure is much high effective, and coordinates of touch points could be calculated much convenient, accurate and reliable.

DETAILED DESCRIPTION OF THE EMBODIMENTS

The invention will be described in detail with the following embodiments and drawings.

Referring to FIGS. 3 through 9, an identification method for simultaneously identifying multiple touch points on a touch screen includes the following steps.

Figure 1:
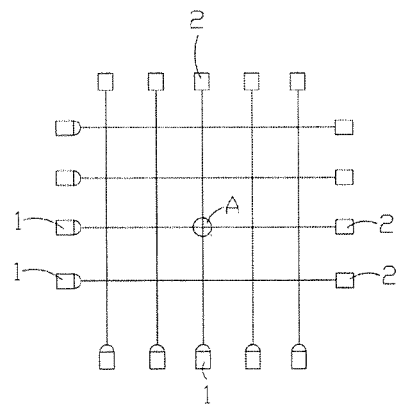
FIG. 1 is a schematic view of recognizing one touch point by conventional technology.
Figure 2:
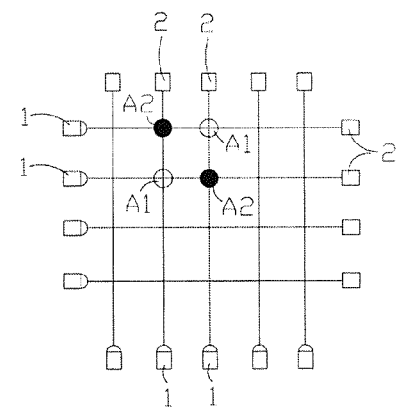
FIG. 2 is a schematic view of recognizing multiple touch points by conventional technology.
Figure 3:
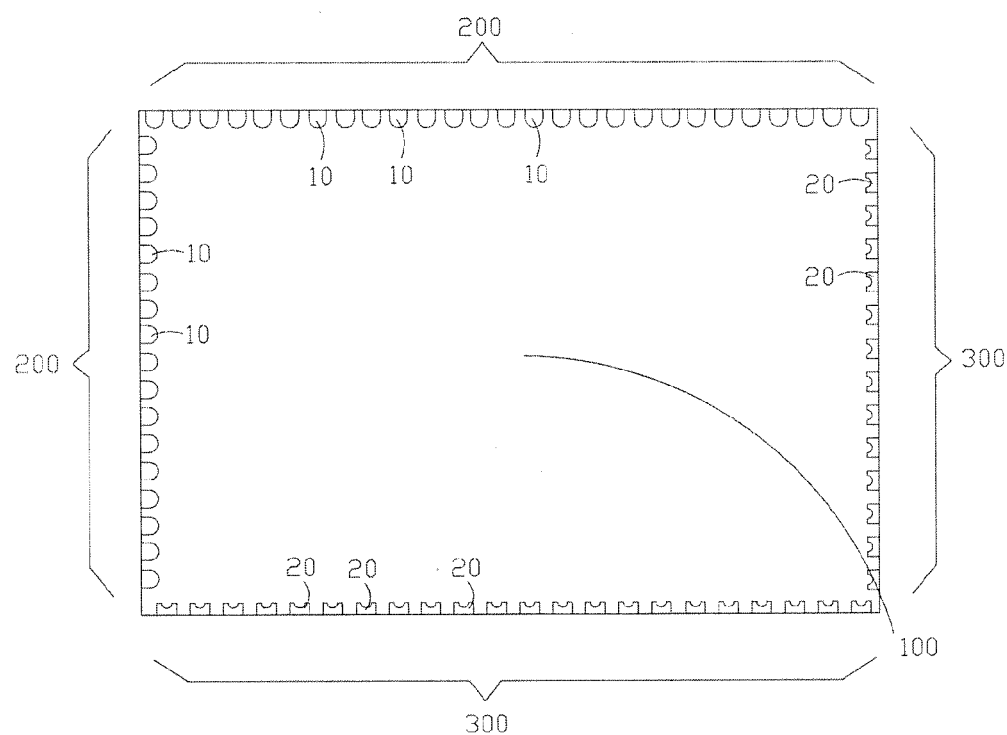
FIG. 3 shows positions of the optical signal emitting terminals and optical signal receiving terminals of the present disclosure.

In a first step, as shown in FIG. 3, a plurality of optical signal emitting terminals 10 and a plurality of optical signal receiving terminals 20 are arranged around a display surface 100.

The optical signal emitting terminals 10 form optical signal emitting units 200, the optical signal receiving terminals 20 form optical signal receiving units 300.

The optical signal emitting units 200 are arranged at edges of the display surface 100; the optical signal receiving units 300 are arranged at other edges of the display surface 100 facing to the optical signal emitting units 200.

The display surface 100 may be a touch screen of a digital product, such as a touch screen of a mobile phone, a touch screen of a computer and touch screens of other digital products.

Referring to FIG. 3, in an embodiment, the display surface 100 is substantially rectangular. The optical signal emitting units 200 are arranged at one horizontal edge and one vertical edge of the display surface 100, the optical signal receiving units 300 are arranged at the other horizontal edge and vertical edge accordingly.

Figure 4A:
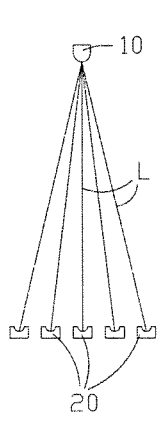
FIG. 4A, FIG. 4B and FIG. 4C show corresponding position of the optical signal emitting terminals and optical signal receiving terminals of the present disclosure.
Figure 4B:
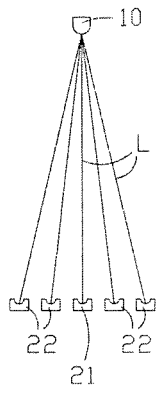
Figure 4C:
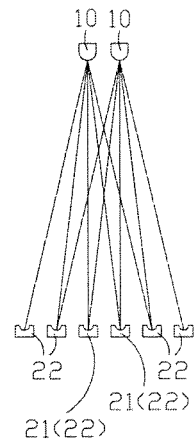

Referring to FIG. 4A, FIG. 4B and FIG. 4C, one optical signal emitting terminal 10 corresponds to at least three optical signal receiving terminals 20, that is, optical signals L emitted by the optical signal emitting terminal 10 can be simultaneously received by at least three optical signal receiving terminals 20, while distances of each pair of adjacent optical signal receiving terminals 20 are identical.

Emitting angle of the optical signal emitting terminal 10 is greater than or equal to 30 degrees.

The optical signal receiving terminal 20 corresponding to the optical signal emitting terminal 10 includes a vertical receiving terminal 21 and tilt receiving terminals 22, wherein the vertical receiving terminal 21 is vertically corresponding to the optical signal emitting terminal 10, and the tilt receiving terminals 22 are symmetrically distributed two sides of the vertical receiving terminal 21.

As abovementioned, according to the arrangement of the optical signal emitting terminal 10 and the optical signal receiving terminal 20, as well as the principles of optics, the optical signals L emitted by the optical signal emitting terminal 10 scans over the display surface 100 forming an isosceles triangle with the optical signal emitting terminal 10 as the vertex, and with a line along which at least one optical signal receiving terminal 20 are queued as the bottom line, wherein the vertical terminal 21 is located at the center of the bottom line, and the optical signals L are filled in the isosceles triangle.

Figure 5A:
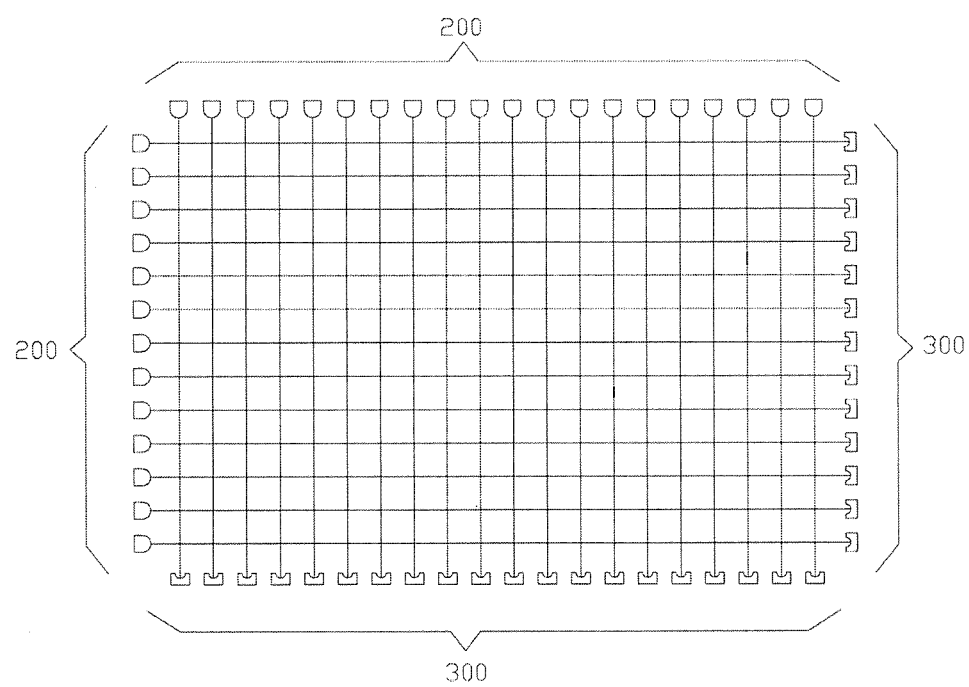
FIG. 5A, FIG. 5B and FIG. 5C are schematic views of the second step of an identification method of the present disclosure.

In a second step, as shown in FIG. 5A, if there are a plurality of touch points A on the display surface 100, the touch points A are between the signal emitting units 200 and the signal receiving units 300. The touch points A are generated by contact stuffs touching the display surface 100, the contact stuffs may be human fingers or touch pens or the like.

The optical signal emitting terminals 10 emit the optical signals L in turn, and the corresponding vertical terminal 21 are also controlled to be in a receiving mode in turn, while other tilt terminals 22 are in a non-receiving mode.

In the processing of the second step, if there is no touch point A between the optical signal emitting terminal 10 and the corresponding vertical terminal 21, the vertical terminal 21 will receive the optical signals L emitted by the optical signal emitting terminal 10, such that a result that there is no touch point A between the optical signal emitting terminal 10 and the corresponding vertical terminal 21 will be obtained.

If there exists a touch point A between the optical signal emitting terminal 10 and the corresponding vertical terminal 21, the vertical terminal 21 will not receive the optical signals L emitted by the optical signal emitting terminal 10, such that a result that there exists a touch point A between the optical signal emitting terminal 10 and the corresponding vertical terminal 21 will be obtained.

Figure 5B:
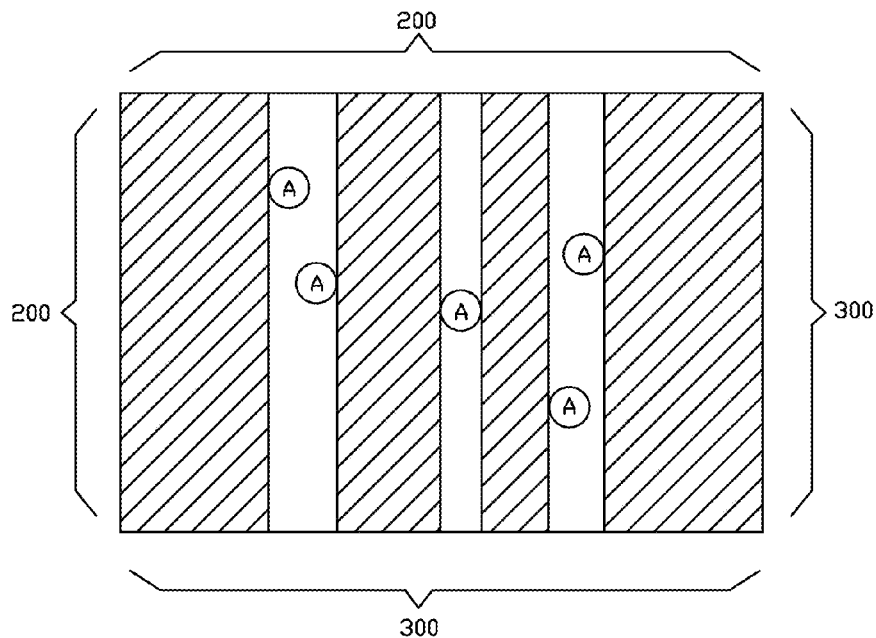
Figure 5C:
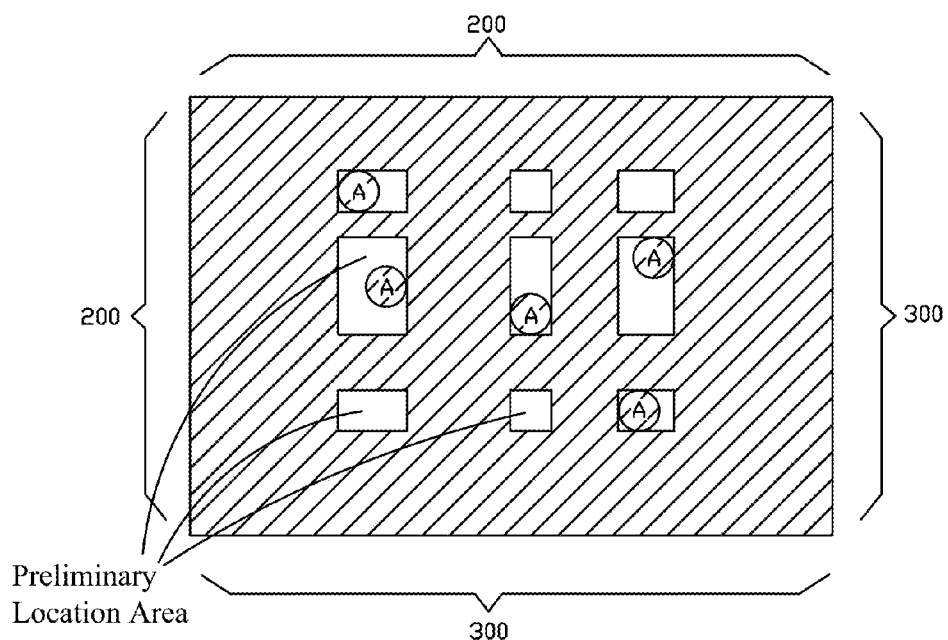

Referring to FIG. 5C, by the above steps, a preliminary location area where the touch points A locate on the display surface 100 is obtained.

The above steps can determine that there exists the touch points A in a vertical area between the optical signal emitting terminal 10 and the corresponding vertical terminal 21, but the specific location of the touch points A in the vertical area cannot be determined.

Referring to FIG. 5A, FIG. 5B and FIG. 5C, when the display surface 100 is a rectangle, the optical signal emitting terminals 10 of the optical signal emitting unit 200 along the horizontal edge of the display surface 100 firstly emit the optical signals L, then the corresponding vertical receiving terminals 21 of the optical signal receiving unit 300 along the horizontal edge of the display surface 100 receive the signals L.

After that, the optical signal emitting terminals 10 of the optical signal emitting unit 200 along the vertical edge of the display surface 100 emit the optical signals L, then the corresponding vertical receiving terminals 21 of the optical signal receiving unit 300 along the vertical edge of the display surface 100 receive the signals L.

In a third step, the preliminary location area obtained in the second step is corrected for the first time to obtain a maximum positive tilt angle correction area.

Figure 6:
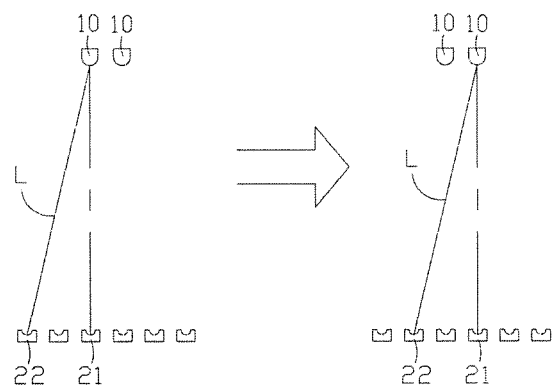
FIG. 6 is a schematic view of the third step of an identification method of the present disclosure.

Referring to FIG. 6, the optical signal emitting terminals 10 emit the optical signals L in turn, and the corresponding tilt terminal 21 are also controlled to be in a receiving mode in turn, the tilt terminal 22 is at one side of the vertical terminal 21 and furthest away from the vertical receiving terminal 21.

In the processing of the third step, if there is no touch point A between the optical signal emitting terminal 10 and the corresponding tilt terminal 22, the tilt terminal 22 will receive the optical signals L emitted by the optical signal emitting terminal 10, such that a result that there is no touch point A between the optical signal emitting terminal 10 and the corresponding tilt terminal 22 will be obtained.

If there exists a touch point A between the optical signal emitting terminal 10 and the corresponding tilt terminal 22, the tilt terminal 22 will not receive the optical signals L emitted by the optical signal emitting terminal 10, such that a result that there exists a touch point A between the optical signal emitting terminal 10 and the corresponding tilt terminal 22 will be obtained.

By the above steps, the preliminary location area obtained in the second step is corrected and narrowed.

In a fourth step, the location area obtained in the third step is corrected for the second time to obtain a maximum negative tilt angle correction area.

Figure 7:
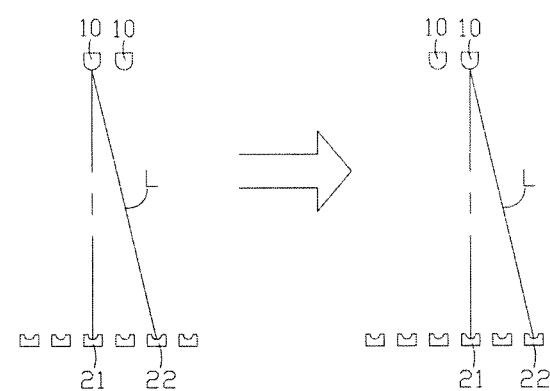
FIG. 7 is a schematic view of the fourth step of an identification of the present disclosure.

Referring to FIG. 7, the optical signal emitting terminals 10 emit the optical signals L in turn, and the corresponding tilt terminal 21 are also controlled to be in a receiving mode in turn, the tilt terminal 22 is at the other side of the vertical terminal 21 and furthest away from the vertical receiving terminal 21.

In the processing of the fourth step, if there is no touch point A between the optical signal emitting terminal 10 and the corresponding tilt terminal 22, the tilt terminal 22 will receive the optical signals L emitted by the optical signal emitting terminal 10, such that a result that there is no touch point A between the optical signal emitting terminal 10 and the corresponding tilt terminal 22 will be obtained.

If there exists a touch point A between the optical signal emitting terminal 10 and the corresponding tilt terminal 22, the tilt terminal 22 will not receive the optical signals L emitted by the optical signal emitting terminal 10, such that a result that there exists a touch point A between the optical signal emitting terminal 10 and the corresponding tilt terminal 22 will be obtained.

By the above steps, the location area obtained in the third step is corrected and narrowed.

What needs to be mentioned here is that the method including the second step to the fourth step of narrowing the area the touch points A located step by step is very high effective, and can highly promote the identification efficiency, reduce calculating times and finally achieve obtaining the position of the touch points A in very short time.

In a fifth step, the optical signal emitting terminals 10 emit the optical signals L in turn, and the corresponding tilt terminal 21 are also controlled to be in a receiving mode in turn.

Figure 8:
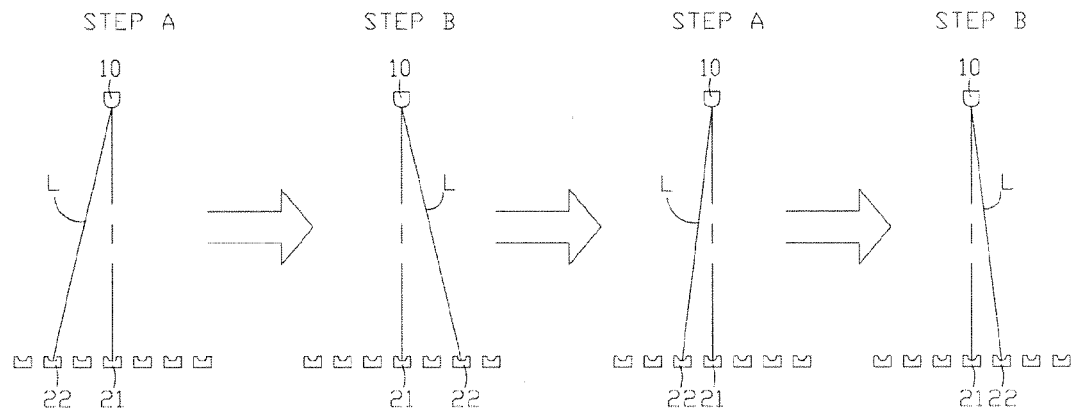
FIG. 8 is a schematic view of the fifth step of an identification method of the present disclosure.

Referring to FIG. 8, in the processing of the fifth step, the way of controlling the corresponding tilt terminal 22 to be in a receiving mode in turn is performed according to the following sequence.

Step A, at one side of the vertical receiving terminal 21, besides the tilt receiving terminal 22 in the third step, other tilt receiving terminals 22 are controlled to be in a receiving mode in turn, from the furthest to the nearest to the vertical receiving terminal 21.

Step B, at the other side of the vertical receiving terminal 21, besides the tilt receiving terminal 22 in the fourth step, other tilt receiving terminals 22 are controlled to be receiving mode in turn, from the furthest to the nearest to the vertical receiving terminal 21.

The above step A and step B are performed repeatedly, and each repeat will obtain certain location area information. The location area becomes smaller and smaller as the step A and step B repeat.

The maximum negative tilt angle correction area obtained in the fourth step is corrected and narrowed to obtain positions of a plurality of touch points A.

In the process of repeating the step A and step B, the location area is optimized, and the number of optical signals emitting terminals 10 emitting the optical signals L is reduced step by step, such that the identification efficiency is promoted and the identification time is reduced.

After the location area information is obtained by repeating the step A and step B, a top border is determined based on the top edge of the location area, a bottom border is determined based on the bottom edge of the location area, a left border is determined based on the left edge of the location area, a right border is determined based on the right edge of the location area. The top border, bottom border, left border and right border together define an optimized area, which is much smaller than the display surface 100, and the touch points A are all located in the optimized area.

Until now, the optical signal emitting terminals 10 without optical signals going through the optimized area stop work, only the optical signal emitting terminals 10 having optical signals going through the optimized area keep working, that is, repeating the step A and step B.

The maximum negative tilt angle correction area obtained in the fourth step is corrected and narrowed to obtain positions of a plurality of touch points A.

Figure 9:
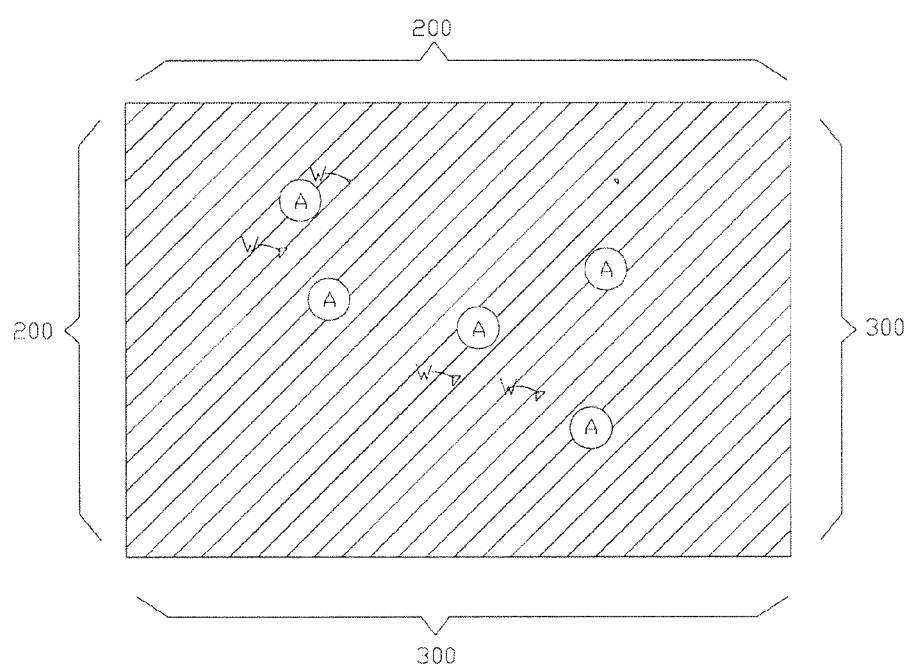
FIG. 9 is a schematic view of the sixth step of an identification method of the present disclosure.

In a sixth step, as shown in FIG. 9, fake points W are get rid of by filtering the positions of the touch points obtained in the fifth step.

The above filtering includes firstly setting geometric area of standard touch points, secondly eliminating touch points A whose areas are smaller than the geometric area of the standard touch points, and finally determining the result position of the touch points A to finish the whole recognition process.

What needs to be emphasized here is that, in process of practical operation, the time of finishing the operation of the above steps by hardware platform is very short, so the method of the present disclosure can quickly and accurately define the position of the touch points on the touch screen. The above optical signals emitted by the optical signal emitting terminals are infrared rays.

In order to simplify the hardware realization and obtain fast response, each emitting terminal emits signals once, n receiving terminal receive the signals simultaneously, wherein each emitting terminal is bounded to n receiving terminals, that is, when an emitting terminal emits signals, only the corresponding n receiving terminals can receive the signals. As a result, while scanning, all the emitting terminals need only to scan once. State of the n receiving terminals corresponding to each emitting terminal is recorded. All the states of the receiving terminals can be described by an array, and each element of the array records n states. Each time the whole area of the display screen is scanned, the array is refreshed.

While referring to specific calculation, in order to optimize algorithm, state of the receiving terminals corresponding to each emitting terminal is firstly extracted from the array to determine area determined by elimination method; state of the receiving terminals with the maximum slope corresponding to each emitting terminal is secondly extracted to correcting the area by elimination method, which correction performs over and over again until the correction of all the state of the corresponding receiving terminal are finished.

The above mentioned technology of the present disclosure not only can identify positions of multiple touch points simultaneously, but also can determine contour of the touch points approximately. The method of the present disclosure is generalized that a plurality of tangent lines around the touch points is sketched to define the contour of the touch points gradually. The method of the present disclosure can determine the contour of the touch points effectively, fast and accurately.

In a specified embodiment, a method to realize the above steps is to build an image whose resolution is the resolution of the infrared emitting terminal, then fill the image, and finally find out effective touch points by recognizing the image. However, while embodied in a computer system, the above algorithm costs much memory and time, the image processing is troublesome too. A fast and effective algorithm is provided below according to the present disclosure.

Firstly, using a polygon to describe areas, wherein the areas are various areas formed in the steps of the present disclosure, and the polygon is described by storing vertexes.

According to the above analysis, the mentioned areas are polygons, which are cut by a plurality of "lines" having width, wherein the polygons are areas formed in the steps of the present disclosure, and the "lines" having width represent the optical signals emitted by the optical signal emitting terminal 10 (the "lines" having width may be taken as parallelogram, while a rectangular is a special parallelogram)

Secondly, the algorithm is generalized as a set of parallelograms are subtracted from a set of polygons, and the finally obtained set of polygons is the set of the touch points.

The set of polygons is initially a rectangular, that is, the whole screen, while the set of parallelograms includes a plurality of "lines" having slope and width. All the parallelograms in the set of parallelograms are subtracted from the set A of polygons one by one repeatedly.

Until now, the conclusion is that the method includes subtracting a parallelogram area b from a set A of polygons to obtain a new set of polygons. The step is repeatedly over and over again.

In a specified embodiment, the algorithm of subtracting a parallelogram area from a set of polygons is described below.

In the process of subtracting polygons from the set A of polygons, c is one polygon of the set A of polygons. There are three cases to process according to the location of the vertexes as shown in FIGS. 10A, 10B, 11A, 11B and 12.

1. All the vertexes of c are not in b (including two cases) as shown in FIGS. 10A and 10B;

1) the points outside b are all at the left side or right side of b

Figure 10A:
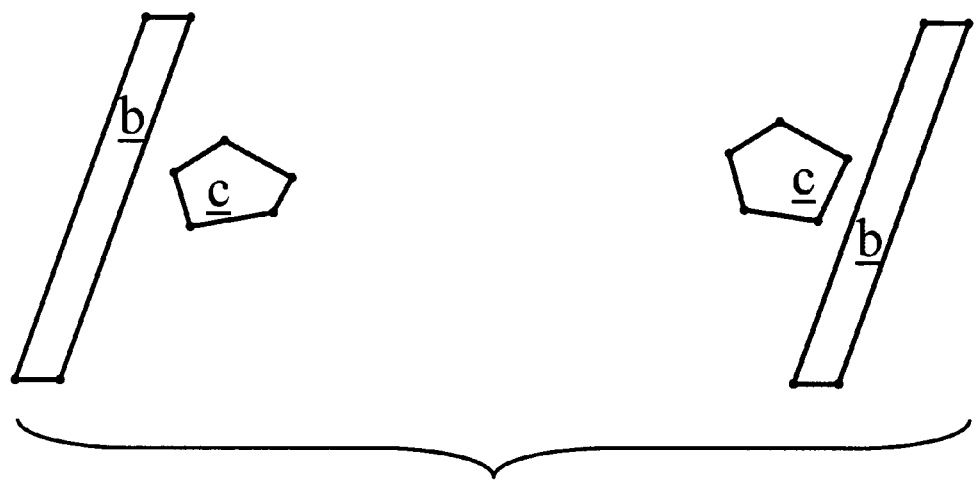
FIGS. 10A, 10B, 11A, 11B and 12 are exemplary views of subtracting a parallelogram area from a set of polygons in relation to the overlap of the parallelogram area with the polygon.
Figure 10B:
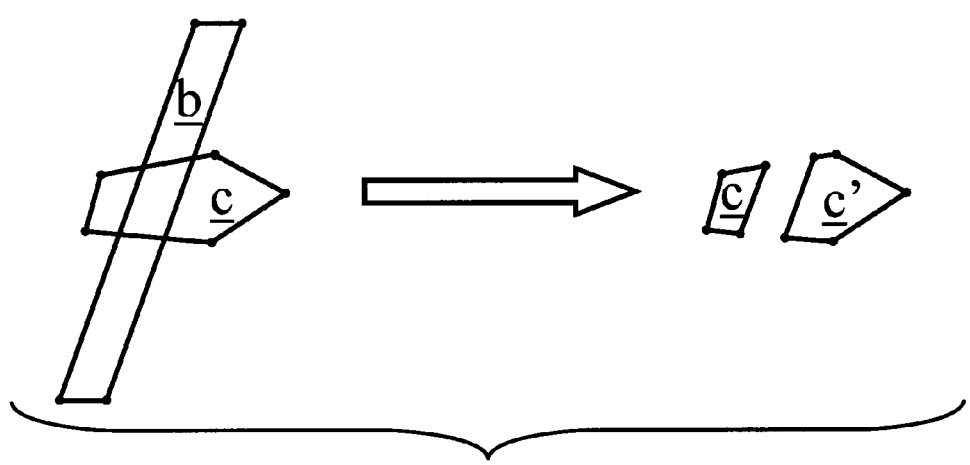

An example is shown in FIG. 10A.

(Polygon c needs no change, nothing has to be done, set A needs no change).

2) the points outside b are at both sides of b

An example is shown in FIG. 10B.

(obtain intersection points between b and c, cut c to two polygons, one more polygon is added to set A)

Figure 11A:
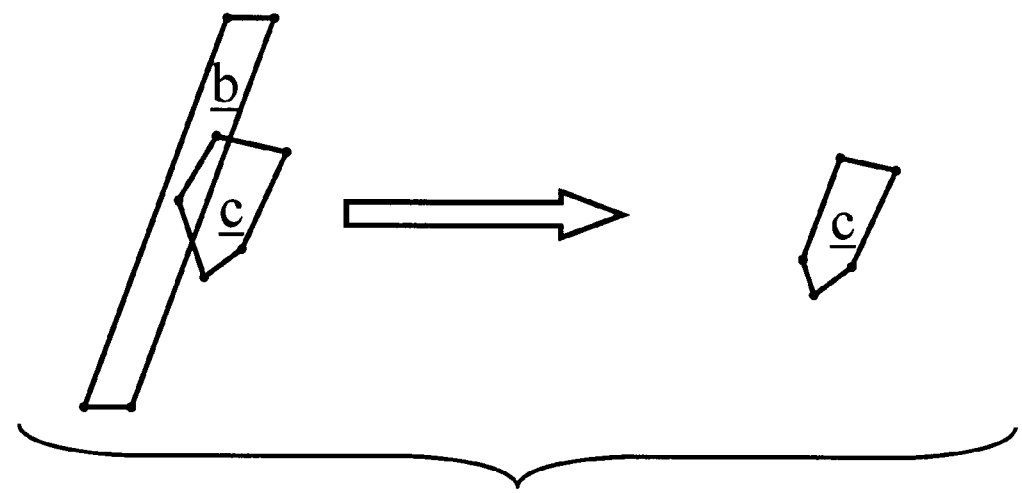
Figure 11B:
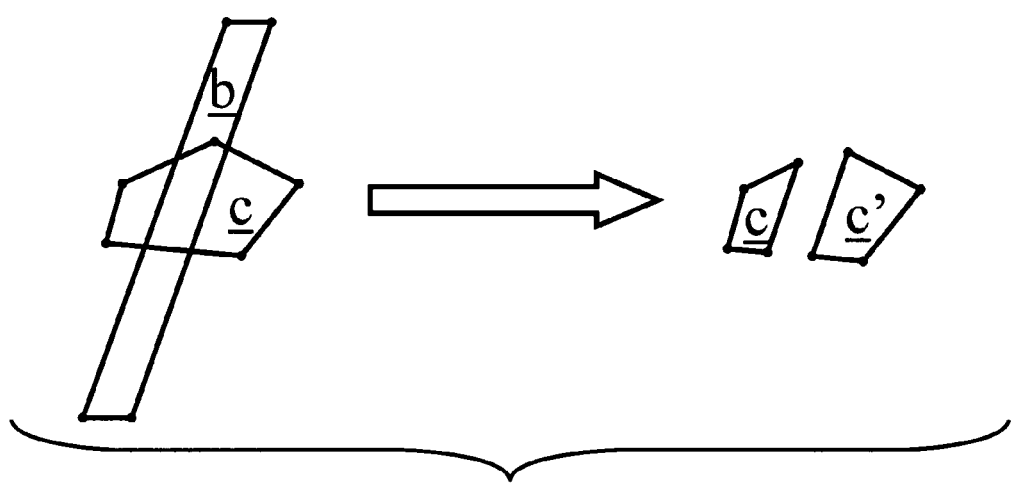

2. some of the vertexes of c are in b (including two cases) as shown in FIGS. 11A and 11B;

1) the points outside b are all at the left side or right side of b;

An example is shown in FIG. 11A.

(obtain intersection points between b and c, refresh vertexes of c, the number of polygons in set A remains unchanged)

2) the points outside b are at both sides of b;

An example is shown in FIG. 11B.

(obtain intersection points between b and c, cut c to two polygons, one more polygon is added to set A)

Figure 12:
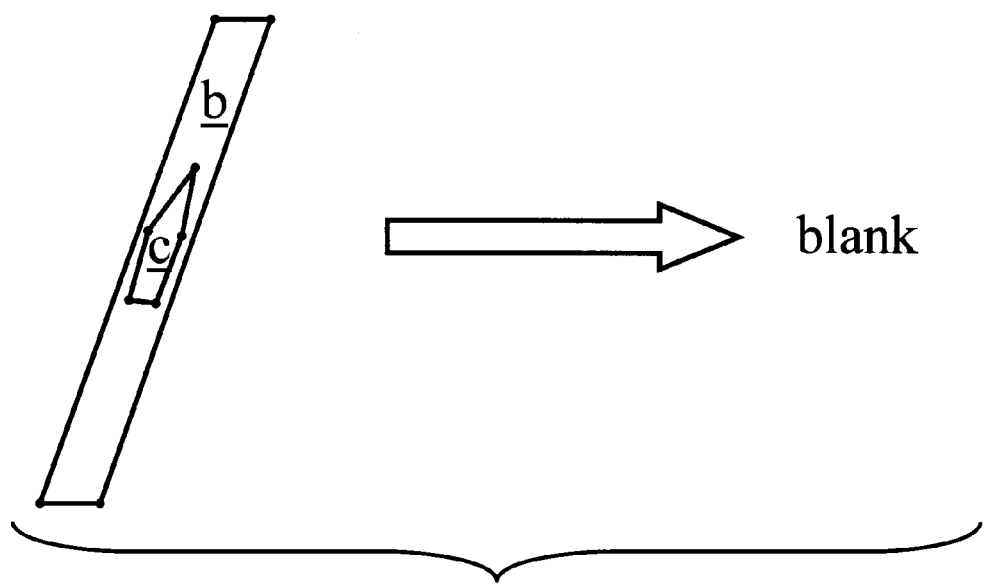

3. All the vertexes of c are in b;

An example is shown in FIG. 12.

(eliminate c from the set A)

Although the present invention has been described with reference to the embodiments thereof and the best modes for carrying out the present invention, it is apparent to those skilled in the art that a variety of modifications and changes may be made without departing from the scope of the present invention, which is intended to be defined by the appended claims.

What is claimed is:

1. An identification method for simultaneously identifying multiple touch points on a touch screen, comprising:

a first step, arranging a plurality of optical signal emitting terminals and a plurality of optical signal receiving terminals around a display surface, the optical signal emitting terminals forming optical signal emitting units, the optical signal receiving terminals forming optical signal receiving units, the optical signal emitting units and the optical signal receiving units being arranged at opposite edges of the display surface;

one optical signal emitting terminal corresponding to at least three optical signal receiving terminals, that is, the optical signal emitted by the optical signal emitting terminal can be simultaneously received by at least three optical signal receiving terminals, distances of each pair of adjacent optical signal receiving terminals being identical; the optical signal receiving terminal corresponding to the optical signal emitting terminal comprising a vertical receiving terminal and tilt receiving terminals, wherein the vertical receiving terminal is vertically corresponding to the optical signal emitting terminal, and the tilt receiving terminals are symmetrically distributed two sides of the vertical receiving terminal;

a second step, if there are a plurality of touch points on the display surface, the touch points being between the signal emitting units and the signal receiving units; the touch points being generated by contact stuffs touching the display surface; the optical signal emitting terminals emitting the optical signals in turn, and the corresponding vertical terminal also controlled to be in a receiving mode in turn, while other tilt terminals being in a non-receiving mode;

in the processing of the second step, if there is no touch point between the optical signal emitting terminal and the corresponding vertical terminal, the vertical terminal will receive the optical signals emitted by the optical signal emitting terminal, such that there is no touch point between the optical signal emitting terminal and the corresponding vertical terminal;

if there exists a touch point between the optical signal emitting terminal and the corresponding vertical terminal, the vertical terminal will not receive the optical signals emitted by the optical signal emitting terminal, such that there exists a touch point between the optical signal emitting terminal and the corresponding vertical terminal;

by the above steps, a preliminary location area where the touch points located on the display surface being obtained;

in a third step, the preliminary location area obtained in the second step being corrected for the first time to obtain a maximum positive tilt angle correction area, the optical signal emitting terminals emitting the optical signals in turn, and the corresponding tilt terminal also controlled to be in the receiving mode in turn, wherein the tilt terminal is at one side of the vertical terminal and furthest away from the vertical receiving terminal;

in the processing of the third step, if there is no touch point between the optical signal emitting terminal and the corresponding tilt terminal, the tilt terminal will receive the optical signals emitted by the optical signal emitting terminal, such that there is no touch point between the optical signal emitting terminal and the corresponding tilt terminal; if there exists a touch point between the optical signal emitting terminal and the corresponding tilt terminal, the tilt terminal will not receive the optical signals emitted by the optical signal emitting terminal, such that there exists a touch point between the optical signal emitting terminal and the corresponding tilt terminal; by the above steps, the preliminary location area obtained in the second step being corrected and narrowed;

in a fourth step, the location area obtained in the third step being corrected for the second time to obtain a maximum negative tilt angle correction area; the optical signal emitting terminals emitting the optical signals in turn, and the corresponding tilt terminal also controlled to be in the receiving mode in turn, wherein the tilt terminal is at the other side of the vertical terminal and furthest away from the vertical receiving terminal;

in the processing of the fourth step, if there is no touch point between the optical signal emitting terminal and the corresponding tilt terminal, the tilt terminal will receive the optical signals emitted by the optical signal emitting terminal, such that there is no touch point between the optical signal emitting terminal and the corresponding tilt terminal will be obtained; if there exists a touch point between the optical signal emitting terminal and the corresponding tilt terminal, the tilt terminal will not receive the optical signals emitted by the optical signal emitting terminal, such that there exists a touch point between the optical signal emitting terminal and the corresponding tilt terminal; by the above steps, the location area obtained in the third step being corrected and narrowed;

in a fifth step, the optical signal emitting terminals emitting the optical signals in turn, and the corresponding tilt terminal also controlled to be in the receiving mode in turn; in the processing of the fifth step, the way of controlling the corresponding tilt terminal to be in the receiving mode in turn being performed according to the following sequence;

step A, at one side of the vertical receiving terminal, besides the tilt receiving terminal in the third step, other tilt receiving terminals being controlled to be receiving mode in turn, from the furthest to the nearest to the vertical receiving terminal;

step B, at the other side of the vertical receiving terminal, besides the tilt receiving terminal in the fourth step, other tilt receiving terminals being controlled to be in the receiving mode in turn, from the furthest to the nearest to the vertical receiving terminal;

the above step A and step B being performed repeatedly, and each repeat will obtain certain location area information; the location area becoming smaller and smaller as the step A and step B repeat; the maximum negative tilt angle correction area obtained in the fourth step being corrected and narrowed to obtain positions of a plurality of touch points;

in a sixth step, fake points being get rid of by filtering the positions of the touch points obtained in the fifth step; the above filtering comprising firstly setting geometric area of standard touch points, secondly eliminating touch points whose areas are smaller than the geometric area of the standard touch points, and finally determining the result position of the touch points to finish the whole recognition process.

2. The method of claim 1, wherein the display surface is a touch screen of a digital product.

3. The method of claim 1, wherein the display surface is substantially rectangular, the optical signal emitting units are arranged at one horizontal edge and one vertical edge of the display surface, and the optical signal receiving units are arranged at the other horizontal edge and vertical edge of the display surface accordingly.

4. The method of claim 3, wherein when the display surface is substantially rectangular, the optical signal emitting terminals of the optical signal emitting unit along the horizontal edge of the display surface firstly emit the optical signals, and then the corresponding vertical receiving terminals of the optical signal receiving unit along the horizontal edge of the display surface receive the signals.

5. The method of claim 1, wherein emitting angle of the optical signal emitting terminal is no less than 30 degrees.

6. The method of claim 1, wherein in the process of repeating the step A and step B, the location area is optimized, and the number of optical signals emitting terminals emitting the optical signals is decreased step by step; after the location area information is obtained by repeating the step A and step B, a top border is determined based on the top edge of the location area, a bottom border is determined based on the bottom edge of the location area, a left border is determined based on the left edge of the location area, a right border is determined based on the right edge of the location area; the top border, bottom border, left border and right border together define on an optimized area, which is much smaller than the display surface, and the touch points are all located in the optimized area; the optical signal emitting terminals without optical signals going through the optimized area stop work, only the optical signal emitting terminals having optical signals going through the optimized area keep working and repeat the step A and step B.

7. The method of claim 1, wherein the optical signals emitted by the optical signal emitting terminal are infrared rays.

* * * * *